US012626372B2

(12) United States Patent
Nicolas

(10) Patent No.: US 12,626,372 B2
(45) Date of Patent: May 12, 2026

(54) SYSTEM AND METHOD FOR ESTIMATING THE DIRECTION OF A MOVEMENT IN VIDEO IMAGES

(71) Applicant: STMICROELECTRONICS INTERNATIONAL N.V., Geneva (CH)

(72) Inventor: Marina Nicolas, Voreppe (FR)

(73) Assignee: STMicroelectronics International N.V., Geneva (CH)

( * ) Notice: Subject to any disclaimer, the term of this patent is extended or adjusted under 35 U.S.C. 154(b) by 359 days.

(21) Appl. No.: 18/535,429

(22) Filed: Dec. 11, 2023

(65) Prior Publication Data

US 2024/0193795 A1     Jun. 13, 2024

(30) Foreign Application Priority Data

Dec. 13, 2022     (FR) ...................................... 2213216

(51) Int. Cl.
G06T 7/12          (2017.01)
G06T 7/136         (2017.01)
(Continued)

(52) U.S. Cl.
CPC ................ G06T 7/248 (2017.01); G06T 7/12 (2017.01); G06T 7/136 (2017.01); G06T 7/215 (2017.01);
(Continued)

(58) Field of Classification Search
CPC ........... G06T 7/248; G06T 7/12; G06T 7/136; G06T 7/215; G06T 2207/10016;
(Continued)

(56) References Cited

U.S. PATENT DOCUMENTS

| | | | |
|---|---|---|---|
| 6,580,812 B1 * | 6/2003 | Harrington | ............. G06T 7/246 356/27 |
| 2008/0218528 A1 * | 9/2008 | Chang | .................... G06V 10/44 345/611 |

(Continued)

FOREIGN PATENT DOCUMENTS

| | | | | |
|---|---|---|---|---|
| JP | 2015194915 A | * | 11/2015 | |
| KR | 20050041886 A | * | 5/2005 | ............... G06T 5/20 |

OTHER PUBLICATIONS

Birgiolas, Justas et al., "SwarmSight: Measuring the temporal progression of animal group activity levels from natural-scene and laboratory videos", Behav Res, 49:576-587, DOI 10.3758/s13428-016-0732-2, 12 pages, Apr. 29, 2016.
(Continued)

*Primary Examiner* — John Villecco
*Assistant Examiner* — Kyla Guan-Ping Tiao Allen
(74) *Attorney, Agent, or Firm* — Slater Matsil, LLP

(57)     ABSTRACT

The present description concerns a system and method of determining at least one classifier of a general movement along a first direction in video images of a scene, comprising determining a differential image based on two video images, selecting pixels of the differential image corresponding to edges of objects, determining, for each selected pixel, at least one classifier of a local movement along the first direction at least at a first or second value, determining a first indicator of the local movement along the first direction, which depends on the sum of the local movement classifiers at the first value and a second indicator of the local movement along the first direction, which depends on the sum of the local movement classifiers at the second value, and determining the general movement classifier based on the comparison of the first and second local movement indicators.

28 Claims, 9 Drawing Sheets

(51) Int. Cl.

| | |
|---|---|
| *G06T 7/207* | (2017.01) |
| *G06T 7/215* | (2017.01) |
| *G06T 7/246* | (2017.01) |
| *G06V 10/44* | (2022.01) |
| *G06V 20/40* | (2022.01) |

(52) U.S. Cl.
CPC .............. *G06T 2207/10016* (2013.01); *G06T 2207/20021* (2013.01); *G06V 10/443* (2022.01); *G06V 20/41* (2022.01)

(58) Field of Classification Search
CPC ........... G06T 2207/20021; G06T 7/254; G06T 7/207; G06T 2207/20104; G06V 10/443; G06V 20/41; G06V 10/25; G06V 10/26; G06V 10/44; G06V 10/764
See application file for complete search history.

(56) References Cited

U.S. PATENT DOCUMENTS

| | | | | |
|---|---|---|---|---|
| 2015/0363933 A1* | 12/2015 | Jung | .......................... | G06T 7/73 382/103 |
| 2020/0104997 A1* | 4/2020 | Takagi | .................. | G06T 7/0016 |

OTHER PUBLICATIONS

Davis, James et al., "Real-Time Motion Template Gradients using Intel CVLib", ResearchGate, XP-002331182, Oct. 1999, 20 pages.
Tao, Sichen et al., "A Novel Artificial Visual System for Motion Direction Detection in Grayscale Images", Mathematics 2022, 10, 2975, https://doi.org/10.3390/math10162975, 32 pages, Aug. 17, 2022.

\* cited by examiner

Im

F1      F2

Idiff

Idiff

W2

W1

Im

Idiff

Idiff

G

I D

SYSTEM AND METHOD FOR ESTIMATING THE DIRECTION OF A MOVEMENT IN VIDEO IMAGES

CROSS-REFERENCE TO RELATED APPLICATIONS

This application claims the benefit of French Patent Application No. 2213216, filed on Dec. 13, 2022, which application is hereby incorporated herein by reference.

TECHNICAL FIELD

The present disclosure generally concerns a system and method of estimation of the direction of a movement in video images.

BACKGROUND

For certain applications using an image sensor supplying video images of a scene, it is desirable to have an estimate of the general direction of a movement in the images supplied by the image sensor. It may be the estimate of the direction of movements of mobile objects of the scene or the estimate of the direction of the movement of the image sensor when the latter is mobile with respect to the scene. An example of application concerns the image sensor of a virtual reality helmet.

There exist methods of estimation of the general direction of a movement in video images based on the analysis of the images supplied by the image sensor. However, such methods generally require the processing of a plurality of images to operate correctly, which implies the storage of information of previous images, while, for certain applications, it is desirable for the estimate of the general direction to be available with a minimum memory cost, rapidly after the acquisition of a new video image, without waiting for a latency period directly induced by the number of images/second of the system.

SUMMARY

There exists a need to overcome all or part of the disadvantages of known methods of estimation of the general direction of a movement in video images.

An embodiment provides a method of determination of at least one classifier of a general movement along a first direction in video images of a scene, comprising the following steps:

a) determining a differential image based on two video images;

b) selecting pixels of the differential image corresponding to edges of objects of the scene;

c) determining, for each pixel selected at step b), at least one classifier of a local movement along the first direction at least at a first value or at a second value;

d) determining a first indicator of the local movement along the first direction which depends on the sum of the classifiers of the local movement along the first direction at the first value and a second indicator of the local movement along the first direction which depends on the sum of the classifiers of the local movement along the first direction at the second value; and e) determining the classifier of the general movement along the first direction based on the comparison of the first and second indicators of the local movement along the first direction.

An embodiment also provides a system of determination of at least one classifier of a general movement along a first direction in video images of a scene, comprising an image sensor of acquisition of the video images and a processing module configured to:

a) determine a differential image based on two video images;

b) select pixels of the differential image corresponding to edges of objects of the scene;

c) determine, for each pixel selected at step b), at least one classifier of the local movement along the first direction at least at a first value or at a second value;

d) determine a first indicator of the local movement along the first direction which depends on the sum of the classifiers of the local movement along the first direction at the first value and a second indicator of the local movement along the first direction which depends on the sum of the classifiers of the local movement along the first direction at the second value; and e) determine the classifier of the general movement along the first direction based on the comparison of the first and second indicators of the local movement along the first direction.

According to an embodiment, at step a), each pixel of the differential image is an affine function of the difference between the pixels at the same position in the two video images.

According to an embodiment, step a) further comprises a step of segmentation of the differential image to delimit at least two portions of the differential image, steps b), c), d), and e) being implemented separately for each portion of the differential image.

According to an embodiment, step b) comprises a first selection of pixels of the differential image for which the absolute value of the difference between the pixel and a constant is greater than a first pixel value threshold.

According to an embodiment, step b) comprises a second selection of pixels of the differential image among the pixels of the first selection comprising the selection, for each group of adjacent pixels along the first direction, only of the pixel at the beginning of the group and of the pixel at the end of the group.

According to an embodiment, step b) comprises the removal from the first selection of each group of adjacent pixels along the first direction for which the number of pixels is smaller than a pixel number threshold.

According to an embodiment, step c) comprises, for each pixel of the differential image selected at step b), the determination of the classifier of the local movement along the first direction of the selected pixel at least at the first value or at the second value based on the value of the selected pixel and on the result of the comparison between a first pixel equal to the pixel of the first or second video image located along the first direction just before the selected pixel or a first noise level equal to the noise level of pixels of the differential image located along the first direction just before the selected pixel and a second pixel equal to the pixel of the first or second video image located along the first direction just after the selected pixel or a second noise level equal to the noise level of pixels of the differential image located along the first direction just after the selected pixel.

According to an embodiment, for each pixel of the differential image selected at step b), step c) comprises:

in the case where the selected pixel is lower than a second pixel value threshold and in the case where the first pixel is lower than the second pixel or the first noise level is lower than the second noise level, the classifier of the local movement along the first direction of the selected pixel is set to the first value;

in the case where the selected pixel is higher than the second pixel value threshold and in the case where the first pixel is lower than the second pixel or the first noise level is lower than the second noise level, the classifier of the local movement along the first direction of the selected pixel is set to the second value;

in the case where the selected pixel is lower than the second pixel value threshold and in the case where the first pixel is higher than the second pixel or the first noise level is higher than the second noise level, the classifier of the local movement along the first direction of the selected pixel is set to the second value; and in the case where the selected pixel is higher than the second pixel value threshold and in the case where the first pixel is higher than the second pixel or the first noise level is higher than the second noise level, the classifier of the local movement along the first direction of the selected pixel is set to the first value.

According to an embodiment, the first noise level is equal to the standard deviation of the values of a number K of adjacent pixels of the differential image along the first direction located just before the selected pixel and the second noise level is equal to the standard deviation of the values of a number K of adjacent pixels of the differential image along the first direction located just after the selected pixel.

According to an embodiment, the first noise level and/or the second noise level are replaced with a maximum noise level value in the case where the K pixels are higher than a third pixel value threshold.

According to an embodiment, the method or the system further comprises:

at step c), determining, for each pixel of the differential image selected at step b), at least one classifier of the local movement along a second direction, different from the first direction, at least at a third value or at a fourth value;

at step d), determining a first indicator of the local movement along the second direction which depends on the sum of the classifiers of the local movement along the second direction at the third value and a second indicator of the local movement along the second direction which depends on the sum of the classifiers of the local movement along the second direction at the fourth value; and at step e), determining a classifier of the general movement along the second direction based on the comparison of the first and second indicators of the local movement along the second direction.

According to an embodiment, at step d), for each pixel of each group of pixels selected at step b) and aligned along a third direction inclined to within 10° along one of the bisectors with respect to the first and second directions, when the classifier of the local movement along the first direction of the pixel in the group is at the first value and the classifier of the local movement along the second direction of the pixel in the group is at the fourth value, the classifier of the local movement along the first direction of the pixel in the group is weighted by a factor smaller than one in the determination of the first indicator of the local movement along the first direction and the classifier of the local movement along the second direction of the pixel in the group is weighted by the factor in the determination of the first indicator of the local movement along the second direction, and, when the classifier of the local movement along the first direction of the pixel in the group is at the second value and the classifier of the local movement along the second direction of the pixel in the group is at the fourth value, the classifier of the local movement along the first direction of the pixel is weighted by the factor in the determination of the second indicator of the local movement along the first direction and the classifier of the local movement along the second direction of the pixel in the group is weighted by the factor in the determination of the second indicator of the local movement along the second direction.

According to an embodiment, the pixels of the video images and of the differential image are arranged in rows and in columns, the first direction corresponding to the row direction and the second direction corresponding to the column direction.

According to an embodiment, the system comprises a device of illumination of the scene with a radiation, the image sensor being configured to acquire video images of the scene by capturing the radiation.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF THE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings or to an image in a normal position of observation.

Unless specified otherwise, the expressions "about", "approximately", "substantially", and "in the order of" signify plus or minus 10%, preferably of plus or minus 5%.

Figure 1:
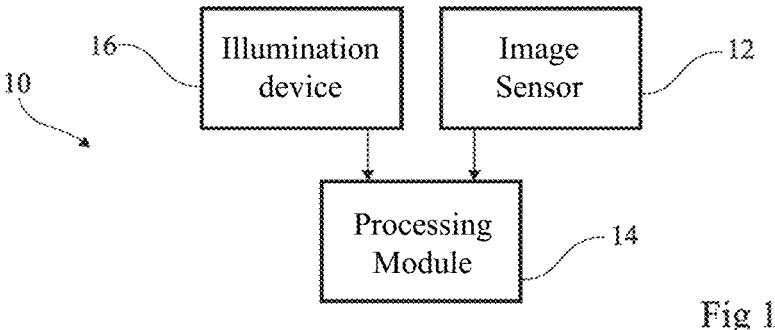
FIG. 1 shows a diagram of a video image acquisition system.

FIG. 1 is a diagram of a video image acquisition system 10 configured for the implementation of a method of estimation of the direction of a movement in the video images. System 10 comprises:
- an image sensor 12 configured to acquire video images of a scene; and
- a processing module 14 configured to receive the successive video images supplied by image sensor 12 and to implement a method of estimation of the direction of a general movement in the received video images.

System 10 may further comprise a device 16 of illumination of the scene. As an example, device 16 of illumination of the scene is configured to emit a radiation, for example an infrared radiation, illuminating the scene and image sensor 12 is configured to acquire video images of the scene, the photodetectors of image sensor 12 being configured to capture the radiation emitted by illumination device 16, image sensor 12 being for example configured to acquire infrared images of the scene.

A pixel of a video image corresponds to the unit element of the video image acquired by image sensor 12. When image sensor 12 is a color image sensor, it generally comprises for the acquisition of each pixel of the image at least three photodetectors, which each capture a light radiation substantially in a single color (for example, red, green, and blue). Each photodetector supplies an analog electric signal representative of the captured light intensity, which is then converted into a digital signal. There is called pixel the digital signal obtained for a single color of the image pixel. When image sensor 12 is a monochrome image sensor, it generally comprises a single photodetector for the acquisition of each pixel of the image.

A video image comprises a set of N rows and M columns of pixels, where N and M are integer numbers, for example varying from 480*640 to 1,920*2,560 for the most currently used resolutions. In the rest of the description, a monochrome image is considered, as an example in grey scale, each pixel being capable of taking a value varying from a minimum value MIN, for example 0, to a maximum value MAX. As an example, when the pixel is coded over 8 bits, each pixel may take 256 values. As an example, minimum value MIN corresponds to the absence of radiation captured by the photodetector, that is, to a black pixel, and maximum value MAX corresponds to a saturation of the image sensor photodetector, that is, to a white pixel.

Figure 2:
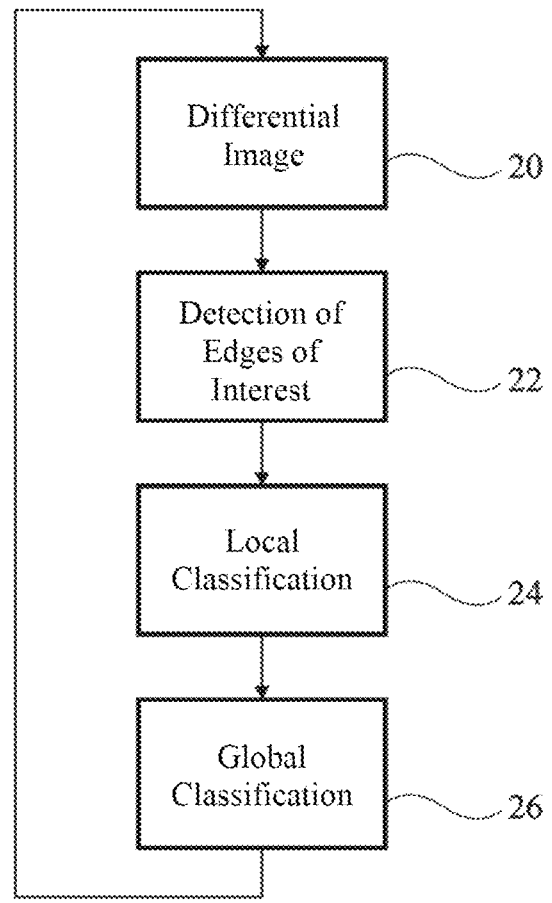
FIG. 2 is a block diagram of an embodiment of a method of estimation of the general movement direction in video images.

FIG. 2 is a block diagram of an embodiment of a method for delivering at least one classifier of the direction of a general movement in video images implemented by the processing module 14 of the system 10 of FIG. 1.

In the rest of the disclosure, there is considered a movement along the row direction of the image towards the last column of the image, called rightward movement hereafter, a movement along the row direction of the image towards the first column of the image, called leftward movement hereafter, a movement along the column direction of the image towards the first row of the image, called upward movement hereafter, and a movement along the column direction of the image towards the last row of the image, called downward movement hereafter.

The method comprises steps 20, 22, 24, and 26. The succession of steps 20, 22, 24, and 26 is repeated along the reception, by processing module 14, of video images acquired by image sensor 12.

Step 20 comprises the determination of a signed differential image Idiff based on two successive video images Im2 and Im1 delivered by image sensor 12, image Im2 being acquired by image sensor 12 after image Im1.

Step 22 comprises the detection of edges of interest in differential image Idiff, an edge of interest corresponding to an edge of an object of the scene which has displaced between image Im1 and image Im2.

Step 24 comprises, for each pixel of the edge of interest detected at step 22, the determination of a classifier of the direction of the local movement of the pixel of the edge of interest.

Step 26 comprises the determination of a classifier of the direction of the general movement in the video images based on the local movement direction classifiers determined at step 24.

According to an embodiment, steps 20, 22, 24, and 26 are successive, step 22 being implemented after the determination of the entire differential image Idiff at step 20, and step 24 being implemented after the determination of all the edges of interest in differential image Idiff at step 22. According to an embodiment, steps 20, 22, 24, and 26 are successively implemented for each row of the differential image as soon as this row of the differential image is determined and before the entire differential image Idiff is determined. According to an embodiment, steps 20, 22, 24, and 26 are successively implemented for each column of the differential image as soon as this column of the differential image is determined and before the entire differential image Idiff is determined.

According to an embodiment, at step 20, each pixel $Pdiff_{i,j}$ at row i and column j of differential image Idiff, i being an integer number varying from 1 to N and j being an integer number varying from 1 to M, is an affine function of the difference between the pixel $P2_{i,j}$ at row i and column j of image Im2 and the pixel $P1_{i,j}$ at row i and column j of image Im1, the coefficients of the affine function being selected so that the obtained value varies from the minimum value MIN to the maximum value MAX.

According to an embodiment, each pixel $Pdiff_{i,j}$ is determined according to the following relation:

$$Pdiff_{i,j} = MOY + \frac{P2_{i,j} - P1_{i,j}}{2} \qquad \text{[Math 1]}$$

where MOY is equal to (MAX–MIN)/2.

In the rest of the disclosure, a pixel of a video image or of a differential image is called light when it is higher than MOY and is called dark when it is lower than MOY. In differential image Idiff, a pixel $Pdiff_{i,j}$ which is light signifies that the pixel $P2_{i,j}$ of image Im2 is lighter than the pixel $P1_{i,j}$ of image Im1 and a pixel $Pdiff_{i,j}$ which is dark signifies that the pixel $P2_{i,j}$ of image Im2 is darker than the pixel $P1_{i,j}$ of image Im1.

Figure 3:
FIG. 3 is a video image of a scene.

FIG. 3 is a video image Im in grey scale of a scene acquired by image sensor 12. The scene shows a person's hands in the foreground with a dark background. For this scene, image sensor 12 is fixed with respect to the scene and the person's hands are mobile with respect to image sensor 12. In FIG. 3, there have been indicated with two arrows F1 and F2 the movements of the person's hands.

Figure 4:
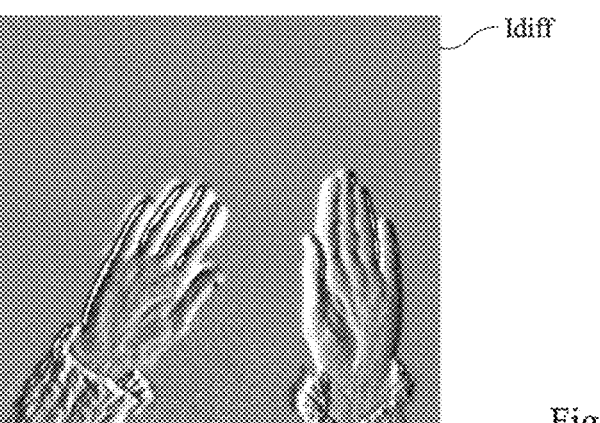
FIG. 4 is a differential image of the scene shown in FIG. 3.

FIG. 4 is a differential image Idiff obtained from the acquisition of two successive video images of the scene shown in FIG. 3, one of these images being FIG. 3. As clearly shown in FIG. 4 for the hand located on the right-hand side, the pixels of the left-hand edge of the hand are light and the pixels of the right-hand edge of the hand are dark, which effectively reflects a leftward movement.

Step 20 may further comprise a step of segmentation of differential image Idiff aiming at extracting from differential image Idiff groups of pixels belonging to distinct objects. The segmentation step may result in the determination of distinct differential sub-images extracted from the differential image, each differential sub-image comprising a set of N' rows and M' columns of pixels, where N' is an integer number smaller than N and M' is an integer number smaller than M. The segmentation step may advantageously be implemented for an application where it is assumed that the scene comprises mobile and distinct objects, each differential sub-image corresponds to an object. The segmentation step may implement a region-based segmentation method, an edge-based segmentation method, and/or the segmentation based on the classification or the thresholding of the pixels according to their intensity. As a variant, the segmentation step may be carried out at step 22 in parallel with the step of detection of the edges of interest.

Figure 5:
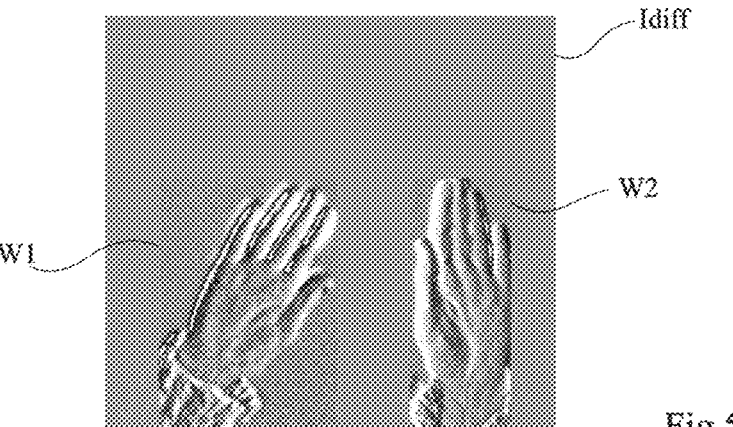
FIG. 5 illustrates the selection of objects in the differential image of FIG. 4.

FIG. 5 shows the differential image Idiff of FIG. 4 after the implementation of a segmentation step on which are delimited two sub-images W1 and W2, which correspond to the hands of the person present on the scene.

Figure 6:
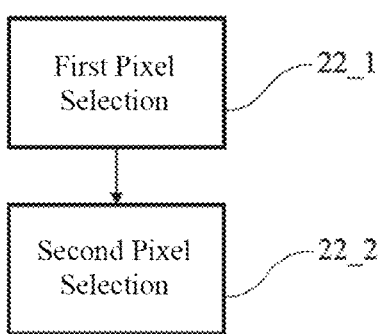
FIG. 6 is a block diagram of an embodiment of a step of the method illustrated in FIG. 2.

FIG. 6 is a block diagram of an embodiment of the step 22 of the method illustrated in FIG. 2.

Step 22 comprises successive steps 22_1 and 22_2.

At step 221, a first selection of pixels of the differential image is performed. According to an embodiment, for each row i of the differential image, and for each pixel $Pdiff_{i,j}$ of the differential image, with j varying from 1 to M, the absolute value of the difference between pixel $Pdiff_{i,j}$ and MOY is compared with a pixel value threshold TH_Pdiff. If the absolute value of the difference between pixel $Pdiff_{i,j}$ and MOY is greater than TH_Pdiff, pixel $Pdiff_{i,j}$ is selected in the first selection. At this step, for each row of the differential image, when there are selected pixels, the selected pixels may form one group, two groups, or more than two groups, each group comprising a plurality of successive pixels.

At step 221, a second selection of pixels of the differential image is performed. According to an embodiment, for each column j of the differential image, and for each pixel $Pdiff_{i,j}$ of the differential image, with i varying from 1 to M, the absolute value of the difference between pixel $Pdiff_{i,j}$ and MOY is compared with the pixel value threshold. If the absolute value of the difference between pixel $Pdiff_{i,j}$ and MOY is greater than TH_Pdiff, pixel $Pdiff_{i,j}$ is selected in the second selection. At this step, for each column of the differential image, when there are selected pixels, the selected pixels form one group, two groups, or more than two groups, each group comprising a plurality of successive pixels.

Threshold TH_Pdiff is selected between values MIN and MAX. Threshold TH_Pdiff particularly depends on the envisaged application of system 10. For an application where it is assumed that the background of the scene essentially corresponds to black pixels on the images acquired by image sensor 12, threshold TH_Pdiff may be low. Such an application for example corresponds to the case where the scene comprises in the foreground objects mobile with respect to image sensor 12. In this case, each group of pixels of the first or second selection corresponds to a mobile object. As an example, threshold TH_Pdiff then varies from 3 to 10, and is for example equal to 5. For an application where it cannot be assumed that the background of the scene essentially corresponds to black pixels on the images acquired by image sensor 12, threshold TH_Pdiff may be higher. Such an application for example corresponds to the case where image sensor 12 is mobile and the scene essentially comprises fixed objects. As an example, threshold TH_Pdiff then varies from 5 to 15, and is for example equal to 10. Threshold TH_Pdiff may be supplied to system 10 by a user.

At step 222, a third selection of pixels of the differential image is performed among the pixels of the first selection and a fourth selection of pixels of the differential image is performed among the pixels of the second selection.

According to an embodiment, at step 222, for each row i of differential image Idiff, and for each group of pixels of the first selection, the third selection consists of only keeping the first pixel in the group and the last pixel in the group. According to an embodiment, this step is only implemented in applications where the elements at the foreground are relatively distinct from the background of the scene. This may correspond to cases where the camera is fixed. For applications where the camera "wanders" about the scene, this step may not be implemented, the different objects in the scene tending to be partly covered, for example. According to an embodiment, at step 222, for each row i of the differential image, and for each group of pixels of the first selection, the third selection consists of not keeping the group when the number of pixels in the group is smaller than a pixel number threshold TH_NB. This enables to discard too thin objects of the selection or detections which would be more linked to noise than to the presence of a real object.

According to an embodiment, at step 222, for each column j of the differential image, and for each group of pixels of the second selection, the fourth selection consists of only keeping the first pixel in the group and the last pixel in the group. According to an embodiment, at step 222, for each column j of the differential image, and for each group of pixels of the second selection, the fourth selection consists of not keeping the group when the number of pixels in the group is smaller than threshold TH_NB. This enables to discard thin objects from the selection or detections which would be more linked to noise than to the presence of a real object.

For each row i and for each column j of the differential image, each pixel $Pdiff_{i,j}$ of the differential image kept after the third selection or the fourth selection is called edge-of-interest pixel $Pint_{i,j}$ hereafter.

According to an embodiment, the threshold TH_NB used at step 222 varies from 3 pixels to 15 pixels and is for example equal to 10 pixels. Threshold TH_NB particularly depends on the envisaged application of system 10 and on the sensor resolution. Threshold TH_NB may be supplied to system 10 by a user.

According to an embodiment, when a step of segmentation of the differential image has been implemented, it is possible to only implement each previously-described step 221 and 22_2 for the sub-images determined during the segmentation step.

According to an embodiment, at step 24, for each row of the differential image and for each edge-of-interest pixel, a local row movement classifier is assigned to the edge-of-interest pixel. The local row movement classifier can take one value among three possible values, one of which indicates a leftward movement, another one of which indicates a rightward movement, and still another one of which indicates an indetermination.

According to an embodiment, at step 24, for each column of the differential image and for each edge-of-interest pixel, a local column movement classifier is assigned to the edge-of-interest pixel. The local column movement classifier can take one value among three possible values, one of which indicates an upward movement, another one of which indicates a downward movement, and still another one of which indicates an indetermination.

Figure 7:
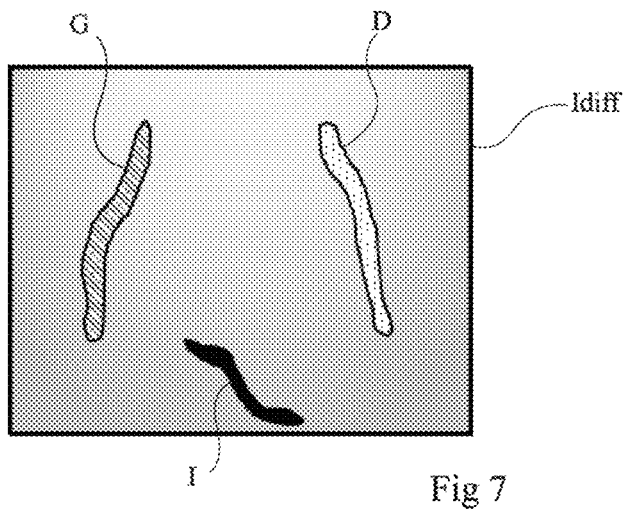
FIG. 7 is a very simplified image illustrating local movement classifiers determined during the implementation of the method illustrated in FIG. 2.

FIG. 7 very schematically shows a differential image Idiff on which, for each edge-of-interest pixel determined at step 24, the local row movement classifier assigned to the edge-of-interest pixel is indicated. As an example, in FIG. 7, there have been shown an area G of edge-of-interest pixels for which the local row movement classifier is at the value indicating a leftward movement, an area D of edge-of-interest pixels for which the local row movement classifier is at the value indicating a rightward movement, and an area I of edge-of-interest pixels for which the local row movement classifier is at the value indicating an indetermination.

Step 24 comprises, for each row i and for each edge-of-interest pixel $Pint_{i,j}$, the comparison of the pixel $P2_{i,j-1}$ of image Im2 located on row i just to the left of the edge-of-interest pixel $Pint_{i,j}$ and of the pixel $P2_{i,j+1}$ of the image Im2 located on row i just to the right of the edge-of-interest pixel $Pint_{i,j}$, taking into account the value of the edge-of-interest pixel $Pint_{i,j}$. As a variant, instead of using the pixel $P2_{i,j-1}$ of the image Im2 located on row i just to the left of edge-of-interest pixel $Pint_{i,j}$, there may be used the average of the reduced number of adjacent pixels located on row i just to the left of edge-of-interest pixel $Pint_{i,j}$, for example 3 or 4 pixels, the reduced number being smaller than the number K of pixels described hereafter. Similarly, instead of using the pixel $P2_{i,j+1}$ of image Im2 located on row i just to the right of edge-of-interest pixel $Pint_{i,j}$, there may be used the average of the reduced number of adjacent pixels located on row i just to right of edge-of-interest pixel $Pint_{i,j}$, for example 3 or 4 pixels, the reduced number being smaller than the number K of pixels described hereafter.

According to an embodiment:

in the case where pixel $P2_{i,j-1}$ is lower than pixel $P2_{i,j-1}$ and edge-of-interest pixel $Pint_{i,j}$ is dark, the local row movement classifier of edge-of-interest pixel $Pint_{i,j}$ is set to the value indicating a rightward movement;

in the case where pixel $P2_{i,j-1}$ is lower than pixel $P2_{i,j-1}$ and where edge-of-interest pixel $Pint_{i,j}$ is light, the local row movement classifier of edge-of-interest pixel $Pint_{i,j}$ is set to the value indicating a leftward movement;

in the case where pixel $P2_{i,j-1}$ is higher than pixel $P2_{i,j-1}$ and edge-of-interest pixel $Pint_{i,j}$ is dark, the local row movement classifier of edge-of-interest pixel $Pint_{i,j}$ is set to the value indicating a leftward movement; and in the case where pixel $P2_{i,j-1}$ is higher than pixel $P2_{i,j-1}$ and edge-of-interest pixel $Pint_{i,j}$ is light, the local row movement classifier of edge-of-interest pixel $Pint_{i,j}$ is set to the value indicating a rightward movement.

Step 24 comprises, for each column j and for each edge-of-interest pixel $Pint_{i,j}$, the comparison of the pixel $P2_{i,j-1}$ of image Im2 located at column j just above edge-of-interest pixel $Pint_{i,j}$ and of the pixel $P2_{i+1,j}$ of the image Im2 located at column j just under edge-of-interest pixel $Pint_{i,j}$, taking into account the value of edge-of-interest pixel $Pint_{i,j}$. As a variant, instead of using the pixel $P2_{i-1,j}$ of image Im2 located on column j just above edge-of-interest pixel $Pint_{i,j}$, there may be used the average of a reduced number of adjacent pixels located on column j just above edge-of-interest pixel $Pint_{i,j}$, for example 3 or 4 pixels, the reduced number being smaller than the number K of pixels described hereafter. Similarly, instead of using the pixel $P2_{i+1,j}$ of image Im2 located on column j just under edge-of-interest pixel $Pint_{i,j}$, there may be used the average of a reduced number of adjacent pixels located on column j just under edge-of-interest pixel $Pint_{i,j}$, for example 3 or 4 pixels, the reduced number being smaller than the number K of pixels described hereafter.

According to an embodiment:

in the case where pixel $P2_{i-1,j}$ is lower than pixel $P2_{i+1,j}$ and edge-of-interest pixel $Pint_{i,j}$ is dark, the local column movement classifier of edge-of-interest pixel $Pint_{i,j}$ is set to the value indicating a downward movement;

in the case where pixel $P2_{i-1,j}$ is lower than pixel $P2_{i+1,j}$ and edge-of-interest pixel $Pint_{i,j}$ is light, the local row movement classifier of edge-of-interest pixel $Pint_{i,j}$ is set to the value indicating an upward movement;

in the case where pixel $P2_{i-1,}$ is higher than pixel $P2_{i+1,j}$ and edge-of-interest pixel $Pint_{i,j}$ is dark, the local row movement classifier of edge-of-interest pixel $Pint_{i,j}$ is set to the value indicating an upward movement; and in the case where pixel $P2_{i-1,j}$ is higher than pixel $P2_{i+1,j}$ and edge-of-interest pixel $Pint_{i,j}$ is light, the local row movement classifier of edge-of-interest pixel $Pint_{i,j}$ is set to the value indicating a downward movement.

According to another embodiment, at step 24, for each row i and for each edge-of-interest pixel $Pint_{i,j}$, the determination of the local row movement classifier of edge-of-interest pixel $Pint_{i,j}$ is implemented without requiring the values of pixels $P2_{i,j-1}$ and $P2_{i,j+1}$ and/or, for each column j and for each edge-of-interest pixel $Pint_{i,j}$, the determination of the local column movement classifier of edge-of-interest pixel $Pint_{i,j}$ is implemented without requiring the values of pixels $P2_{i-1,j}$ and $P2_{i+1,j}$.

According to an embodiment, only the differential image is used to determine whether the pixels of the differential image close to an edge-of-interest pixel $Pint_{i,j}$ are darker or lighter than edge-of-interest pixel $Pint_{i,j}$. This is based on the fact that the analog electric signal supplied by each photo-detector of image sensor 12 is substantially proportional to the number of photons received by the photodetector while the noise level associated with this electric signal is substantially proportional to the square root of the number of photons received by the photodetector. Since each pixel $Pdiff_{i,j}$ of the differential image is obtained from the difference between the pixel $P2_{i,j}$ of image Im2 and the pixel $P1_{i,j}$ of image Im1, this difference tends towards zero for each pixel of the differential image when the value of pixels $P2_{i,j}$ and $P1_{i,j}$ has substantially not varied between images Im2 and Im1, particularly when it is a pixel corresponding to the background of the scene. Conversely, the noise level associated with the pixel $Pdiff_{i,j}$ of the differential image corresponds to the sum of the noise level of pixel $P2_{i,j}$ and of the noise level of pixel $P1_{i,j}$. Thereby, for a pixel which does not substantially vary on image Im1 and image Im2, particularly a pixel remaining at the background of the scene in image Im1 and image Im2, the noise level of the pixel $Pdiff_{i,j}$ of the differential image is all the lower as pixels $P2_{i,j}$ and $P1_{i,j}$ are dark.

According to an embodiment, for each edge-of-interest pixel $Pint_{i,j}$ of the differential image, a left-hand row noise level $\sigma G_{i,j}$ is estimated over a number K of pixels of row i of the differential image located before edge-of-interest pixel $Pint_{i,j}$, and a right-hand row noise level $\sigma D_{i,j}$ is estimated over a number K of pixels of row i of the differential image located after edge-of-interest pixel $Pint_{i,j}$. The left-hand row noise level $\sigma G_{i,j}$ and the right-hand row noise level $\sigma D_{i,j}$ are then compared. When two edge-of-interest pixels $Pint_{i,j}$ are separated by less than K pixels, it is considered that the determination of the row noise level between the two edge-of-interest pixels $Pint_{i,j}$ is not possible and the local row movement classifier of each of these two edge-of-interest pixels $Pint_{i,j}$ is set to the value indicating an indetermination. As an example, number K varies from 5 to 15, and is for example equal to 8.

According to an embodiment, the noise level is equal to the standard deviation of the K values of the considered pixels of the differential image, that is, equal to the square root of the difference between the average of the squares of the K values of the considered pixels of the differential image and the square of the average of the K values of the considered pixels of the differential image.

According to an embodiment:
in the case where the left-hand row noise level $\sigma G_{i,j}$ is lower than the right-hand row noise level $\sigma D_{i,j}$ and edge-of-interest pixel $Pint_{i,j}$ is dark, the local row movement classifier of edge-of-interest pixel $Pint_{i,j}$ is set to the value indicating a rightward movement;
in the case where the left-hand row noise level $\sigma G_{i,j}$ is lower than the right-hand row noise level $\sigma D_{i,j}$ and edge-of-interest pixel $Pint_{i,j}$ is light, the local row movement classifier of edge-of-interest pixel $Pint_{i,j}$ is set to the value indicating a leftward movement;
in the case where the left-hand row noise level $\sigma G_{i,j}$ is higher than the right-hand row noise level $\sigma D_{i,j}$ and edge-of-interest pixel $Pint_{i,j}$ is dark, the local row movement classifier of edge-of-interest pixel $Pint_{i,j}$ is set to the value indicating a leftward movement; and
in the case where the left-hand row noise level $\sigma G_{i,j}$ is higher than the right-hand row noise level $\sigma D_{i,j}$ and edge-of-interest pixel $Pint_{i,j}$ is light, the local row movement classifier of edge-of-interest pixel $Pint_{i,j}$ is set to the value indicating a rightward movement.

According to an embodiment, for each edge-of-interest pixel $Pint_{i,j}$ of the differential image, an upper column noise level $\sigma H_{i,j}$ is estimated over a number K of pixels of column j of the differential image located above edge-of-interest pixel $Pint_{i,j}$, and a lower column noise level $\sigma B_{i,j}$ is estimated over a number K of pixels of column j of the differential image located above edge-of-interest pixel $Pint_{i,j}$. The upper column noise level $\sigma H_{i,j}$ and the lower column noise level $\sigma B_{i,j}$ are then compared. When two edge-of-interest pixels $Pint_{i,j}$ are separated by at least K pixels, it is considered that the determination of the column noise level between the two edge-of-interest pixels $Pint_{i,j}$ is not possible and the local column movement classifier of each of these two edge-of-interest pixels $Pint_{i,j}$ is set to the value indicating an indetermination.

According to an embodiment:
in the case where the upper column noise level $\sigma H_{i,j}$ is lower than the lower column noise level $\sigma B_{i,j}$ and edge-of-interest pixel $Pint_{i,j}$ is dark, the local column movement classifier of the edge-of-interest pixel $Pint_{i,j}$ is set to the value indicating a downward movement;
in the case where the upper column noise level $\sigma H_{i,j}$ is lower than the lower column noise level $\sigma B_{i,j}$ and edge-of-interest pixel $Pint_{i,j}$ is light, the local row movement classifier of edge-of-interest pixel $Pint_{i,j}$ is set to the value indicating an upward movement;
in the case where the upper column noise level $\sigma H_{i,j}$ is higher than the lower column noise level $\sigma B_{i,j}$ and edge-of-interest pixel $Pint_{i,j}$ is dark, the local row movement classifier of edge-of-interest pixel $Pint_{i,j}$ is set to the value indicating an upward movement; and
in the case where the upper column noise level $\sigma H_{i,j}$ is higher than the lower column noise level $\sigma B_{i,j}$ and edge-of-interest pixel $Pint_{i,j}$ is light, the local row movement classifier of edge-of-interest pixel $Pint_{i,j}$ is set to the value indicating a downward movement.

According to an embodiment, the estimate of the noise may not be determined for the pixels of the differential image of the background of the scene and it can be assumed that the background pixels are always dark. This may in particular be the case for an application where image sensor 12 is fixed and the scene comprises mobile objects in the foreground.

The noise level estimate may be incorrect when the pixels of video images Im1 and Im2 are saturated. Indeed, in this case, since the K pixels used to determine the row or column noise level are all or mostly at value MAX, the row or column noise level thus determined as previously described has a low value, which is incorrect. According to an embodiment, a correction is implemented when the estimated row or column noise level is low while the pixels of images Im1 and Im2 used to determine this noise level are saturated. In this case, the row or column noise level is set to a maximum value, for example equal to 255 if the level is expressed over 8 bits. This correction may be performed without accessing the values of the pixels of images Im1 and Im2 since an abnormally low noise level (at zero or close to zero) indicates a very high saturation probability.

According to an embodiment, when the number of local row of column movement classifiers which are not at the value indicating an indetermination is reduced, this may signify that the pixel number threshold TH_NB used at step 22 is too high, causing the rejection of the edges of interest which might take part in the estimation of the movement. According to an embodiment, a correction is implemented when the number of local row or column movement classifiers which are not at the value indicating an indetermination is smaller than a threshold. In this case, the pixel number threshold TH_NB used at step 22 is increased and steps 22 and 24 are carried out again.

Step 26 comprises the determination of a classifier of the general movement direction in the video images based on the local row movement classifier and on the local column movement classifier determined at step 24, which have values different from the value indicating an indetermination. According to an embodiment, when a segmentation step of the differential image has been implemented, step 26 may be performed separately for each sub-image determined at the segmentation step and a classifier of the general movement direction may be determined for each sub-image determined at the segmentation step.

According to an embodiment, there is determined:

a leftward movement indicator, which corresponds to the number of edge-of-interest pixels $\text{Pint}_{i,j}$ for which the local row movement classifier has the value indicating a leftward movement;

a rightward movement indicator, which corresponds to the number of edge-of-interest pixels $\text{Pint}_{i,j}$ for which the local row movement classifier has the value indicating a rightward movement;

an upward movement indicator, which corresponds to the number of edge-of-interest pixels $\text{Pint}_{i,j}$ for which the local column movement classifier has the value indicating an upward movement; and a downward movement indicator, which corresponds to the number of edge-of-interest pixels $\text{Pint}_{i,j}$ for which the local column movement classifier has the value indicating a downward movement.

Step 26 further comprises a comparison of the leftward movement indicator and of the rightward movement indicator to determine the general row movement classifier, and a comparison between the upward movement indicator and the downward movement indicator to determine the general column movement classifier. According to an embodiment, when the rightward movement indicator is greater than the leftward movement indicator, the general row movement classifier is set to a value indicating a general rightward row movement and when the rightward movement indicator is smaller than the leftward movement indicator, the general row movement classifier is set to a value indicating a general leftward row movement. According to an embodiment, when the upward movement indicator is greater than the downward movement indicator, the general column movement classifier is set to a value indicating a general upward row movement and when the upward movement indicator is smaller than the downward movement indicator, the general column movement classifier is set to a value indicating a general downward row movement.

For an object having an edge which appears as an edge inclined by 45° on the video images acquired by image sensor 12, a difficulty originates from the fact that it may not be possible to tell a rightward movement from a downward movement. Similarly, for an object having an edge which appears as an edge inclined by 135° on the video images acquired by image sensor 12, a difficulty originates from the fact that it may not be possible to tell a leftward movement from a downward movement. According to an embodiment, step 26 comprises the detection of the fact that edge-of-interest pixel $\text{Pint}_{i,j}$ belongs to an inclined edge of an object. If edge-of-interest pixel $\text{Pint}_{i,j}$ belongs to an inclined edge and the local row movement classifier of this edge-of-interest pixel $\text{Pint}_{i,j}$ indicates a leftward movement and the local column movement classifier of this edge-of-interest pixel $\text{Pint}_{i,j}$ indicates a downward movement, then a factor ½ is applied to the local row movement classifier of this edge-of-interest pixel $\text{Pint}_{i,j}$ during the determination of the leftward movement indicator and a factor ½ is applied to the local column movement classifier of this edge-of-interest pixel $\text{Pint}_{i,j}$ during the determination of the downward movement indicator. If the edge of interest belongs to an inclined edge and the local row movement classifier of this edge-of-interest pixel $\text{Pint}_{i,j}$ indicates a rightward movement and the local column movement classifier of this edge-of-interest pixel $\text{Pint}_{i,j}$ indicates a downward movement, then a factor ½ is applied to the local row movement classifier of this edge-of-interest pixel $\text{Pint}_{i,j}$ during the determination of the rightward movement indicator and a factor ½ is applied to the local column movement classifier of this edge-of-interest pixel $\text{Pint}_{i,j}$ during the determination of the downward movement indicator.

According to an embodiment, the general row and/or column movement classifier is determined based on a single differential image. This advantageously allows the determination of the general row and/or column movement classifier with a reduced latency, for example at the frequency of delivery of the differential images.

According to an embodiment, the general row and/or column movement classifier is determined based on a reduced number of calculations. This allows the implementation of the method of estimation of the direction of a movement in video images by an electronic circuit with a low manufacturing cost.

According to an embodiment, the general row and/or column movement classifier is determined without requiring having a direct access to the values of the pixels of the video images used to determine the differential image. This advantageously enables to be able to do away with the storage of video images in a memory, particularly when the differential image is determined in analog fashion based on the difference between two successive integrations performed by each photodetector of image sensor 12.

Tests have been performed. For these tests, device 16 of illumination of the scene is configured to emit an infrared radiation illuminating the scene and image sensor 12 is configured to acquire infrared video images of the scene at a frequency of 186 images per second. For each test, there has especially been shown in figures a video image in grey scale of the scene, a differential image obtained from the acquisition of two successive video images of the scene, a differential image for which each pixel of an edge of interest of the differential image is replaced with a color pixel having its color depending on the value of the local row movement classifier of the pixel determined at step 24 of the previously-described method assigned to the pixel or of the local column movement classifier determined at step 24 of the previously-described method assigned to the pixel.

In particular, each blue area D or B corresponds to pixels of an edge of interest for which the local row movement classifier indicates a rightward movement (area D) or the local column movement classifier indicates a downward movement (area B), each pink area G or H corresponds to pixels of an edge of interest for which the local row movement classifier indicates a leftward movement (area G) or the local column movement classifier indicates an upward movement (area H), and each green area I corresponds to pixels of an edge of interest for which the local row movement classifier or the local column movement classifier indicates an indetermination. The local row and column movement classifiers have been determined for all tests by implementing the previously-described embodiment using row and column noise level estimates.

Figure 8:
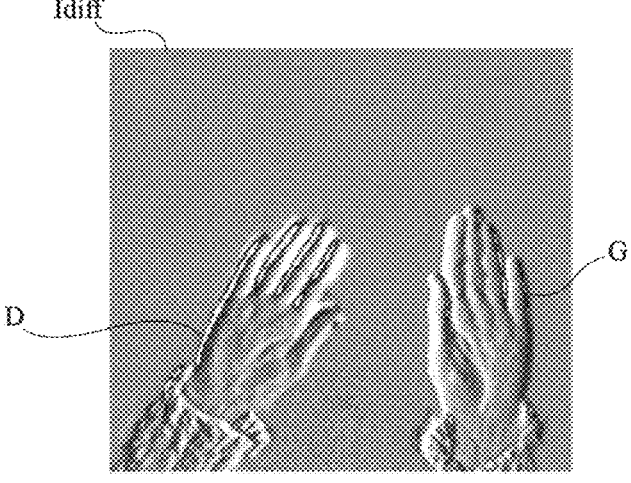
FIG. 8 illustrates local movement classifiers determined based on the differential image of FIG. 4.

The images shown in FIG. 3, FIG. 4, FIG. 5, previously described, and FIG. 8 have been obtained during a first test.

FIG. 8 shows the differential image Idiff of FIG. 4 in which are further shown the areas D of edge-of-interest pixels for which the local row movement classifier indicates a rightward movement and the areas G of edge-of-interest pixels for which the local row movement classifier indicates a leftward movement. For the hand located on the left-hand side, the leftward movement indicator is equal to 103 and the rightward movement indicator is equal to 144, which reflects the rightward movement of this hand. For the hand located on the right-hand side, the leftward movement indicator is equal to 162 and the rightward movement indicator is equal to 79, which reflects the leftward movement of this hand.

Figure 9:
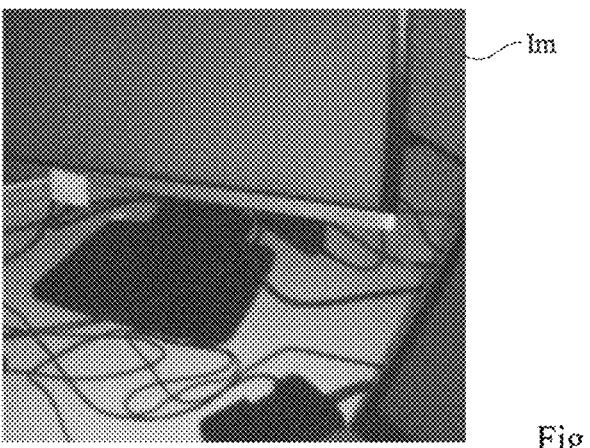
FIG. 9 is a video image of another scene.
Figure 10:
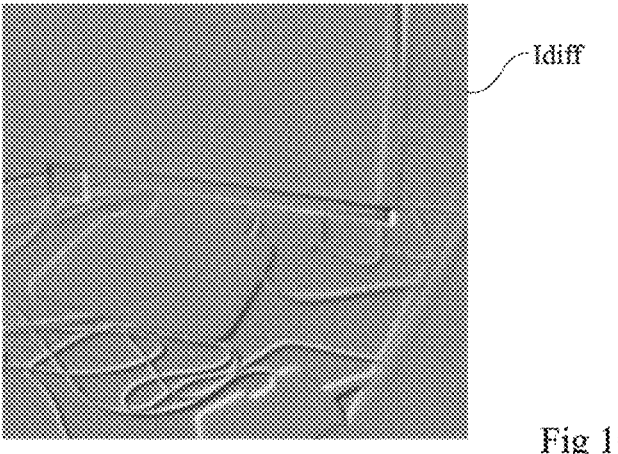
FIG. 10 is a differential image of the scene shown in FIG. 9.
Figure 11:
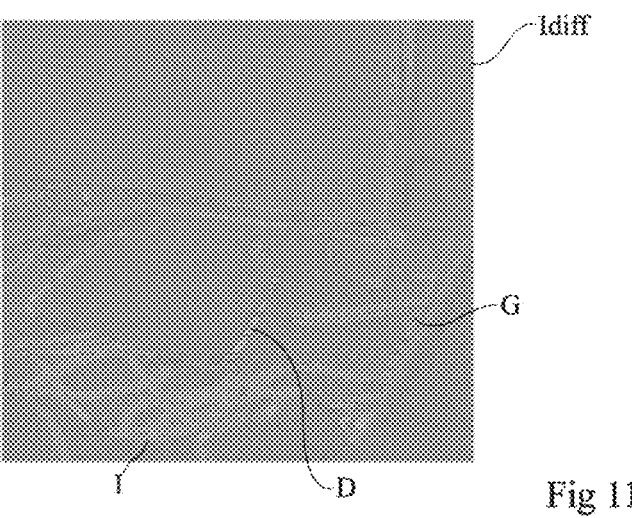
FIG. 11 illustrates local movement classifiers determined based on the differential image of FIG. 10.

The images shown in FIG. 9, FIG. 10, and FIG. 11 have been obtained during a second test.

FIG. 9 is a video image Im in grey scale of a scene acquired by image sensor 12. The elements of the scene are fixed and image sensor 12 is mobile with respect to the scene.

FIG. 10 is a differential image Idiff obtained from the acquisition of two successive video images of the scene shown in FIG. 9.

FIG. 11 shows the differential image Idiff of FIG. 10 on which are further shown the areas D of edge-of-interest pixels for which the local row movement classifier indicates a rightward movement, the areas G of edge-of-interest pixels for which the local row movement classifier indicates a leftward movement, and the areas I of edge-of-interest pixels for which the local row movement classifier indicates an indetermination. The leftward movement indicator is equal to 1,785 and the rightward movement indicator is equal to 3,292, which corresponds to a general rightward movement of image sensor 12.

The images shown in FIG. 12, FIG. 13, FIG. 14, and FIG. 15 have been obtained during a third test.

Figure 12:
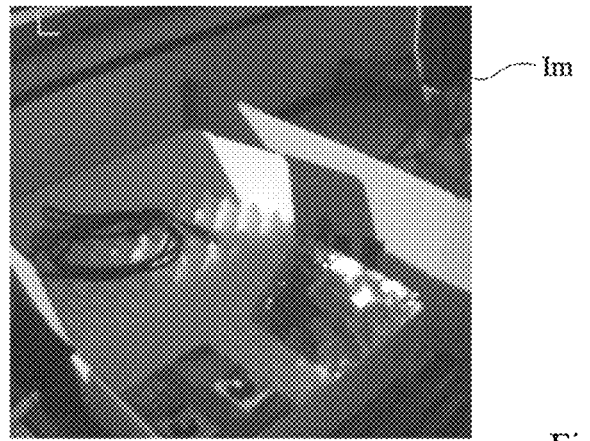
FIG. 12 is a video image of another scene.

FIG. 12 is a video image Im is grey scale of a scene acquired by image sensor 12. The elements of the scene are fixed and image sensor 12 is mobile with respect to the scene.

Figure 13:
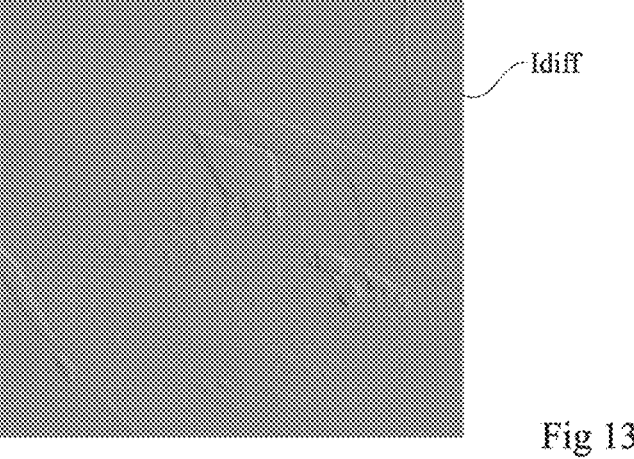
FIG. 13 is a differential image of the scene shown in FIG. 12.

FIG. 13 is a differential image Idiff obtained from the acquisition of two successive video images of the scene shown in FIG. 12.

Figure 14:
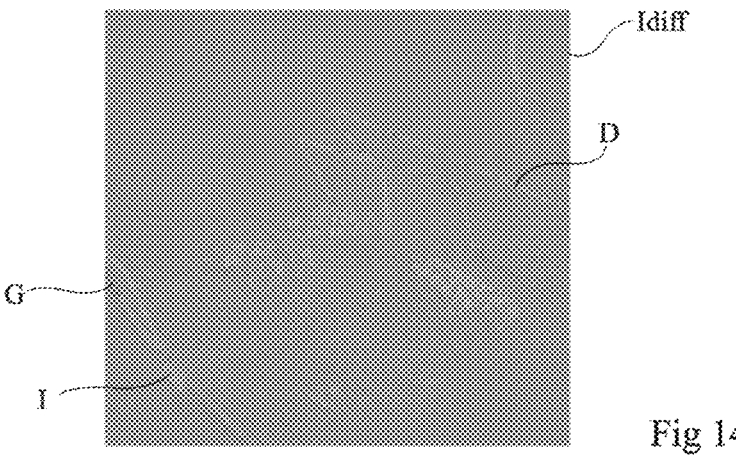
FIG. 14 illustrates local row movement classifiers determined based on the differential image of FIG. 13.

FIG. 14 shows the differential image Idiff of FIG. 13 in which are further shown the areas D of edge-of-interest pixels for which the local row movement classifier indicates a rightward movement, the areas G of edge-of-interest pixels for which the local row movement classifier indicates a leftward movement, and the areas I of edge-of-interest pixels for which the local row movement classifier indicates an indetermination. The leftward movement indicator is equal to 772 and the rightward movement indicator is equal to 5,279.

Figure 15:
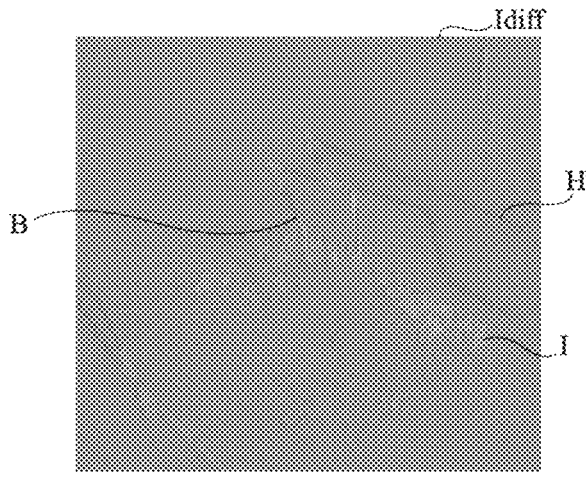
FIG. 15 illustrates local column movement classifiers determined based on the differential image of FIG. 13.

FIG. 15 shows the differential image Idiff of FIG. 13 in which are further shown the areas H of edge-of-interest pixels for which the local column movement classifier indicates an upward movement, the areas B of edge-of-interest pixels for which the local column movement classifier indicates a downward movement, and the areas I of edge-of-interest pixels for which the local column movement classifier indicates an indetermination. The upward movement indicator is equal to 5,381 and the downward movement indicator is equal to 1,871.

Figure 16:
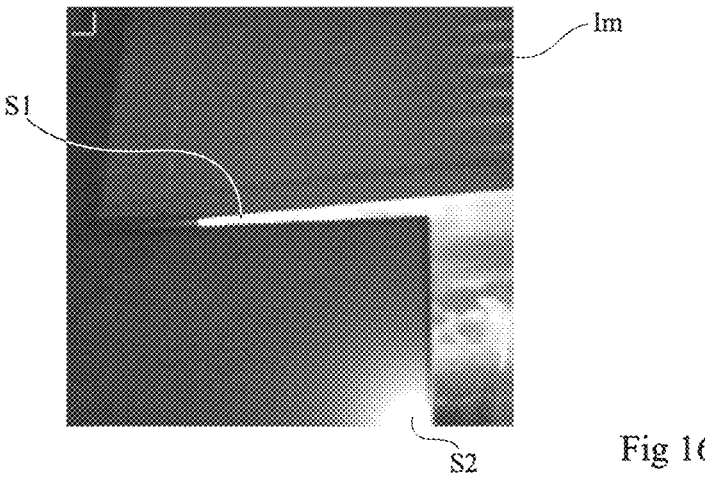
FIG. 16 is a video image of another scene.
Figure 17:
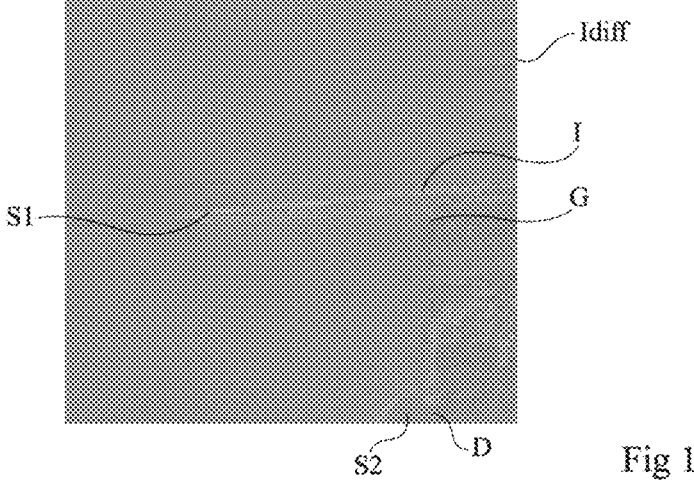
FIG. 17 illustrates local row movement classifiers determined based on a differential image of the scene of FIG. 16.
Figure 18:
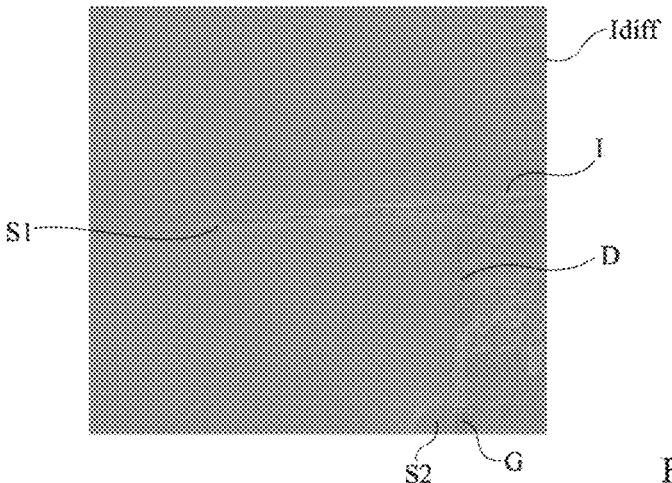
FIG. 18 is a figure similar to FIG. 17 after the implementation of a correction step.

The images shown in FIG. 16, FIG. 17, and FIG. 18 having been obtained during a fourth test.

FIG. 16 is a video image in grey scale of a scene acquired by image sensor 12. The elements of the scene are fixed and image sensor 12 is mobile with respect to the scene. As shown in this image, the pixels are saturated at least at areas S1 and S2.

FIG. 17 shows the differential image Idiff of FIG. 16 in which are further shown the areas D of edge-of-interest pixels for which the local row movement classifier indicates a rightward movement, the areas G of edge-of-interest pixels for which the local row movement classifier indicates a leftward movement, and the areas I of edge-of-interest pixels for which the local row movement classifier indicates an indetermination. The local row movement classifiers in the vicinity of areas S1 and S2 are incorrect.

FIG. 18 is a figure similar to FIG. 17 obtained after implementation of the previously-described correction when the estimated row or column noise level is low while the pixels of images Im1 and Im2 used to determine this noise level are saturated. In this case, the row or column noise level is set to a maximum value. As shown in this image, the local row movement classifiers have been corrected in the vicinity of areas S1 and S2.

Figure 19:
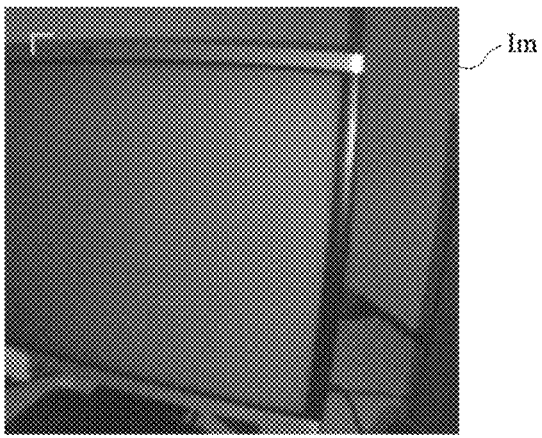
FIG. 19 is video image of another scene.
Figure 20:
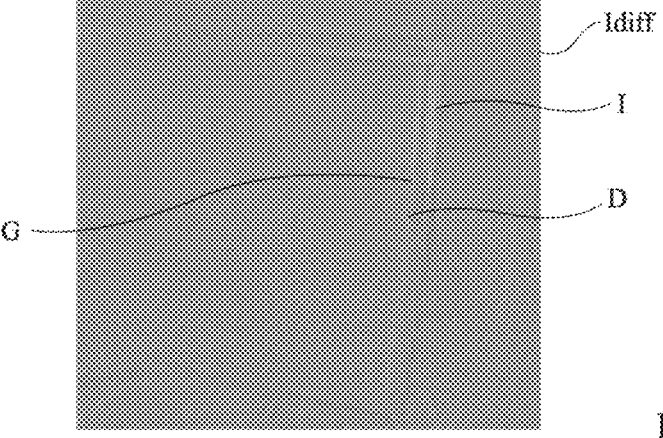
FIG. 20 illustrates local row movement classifiers determined based on a differential image of the scene of FIG. 19.
Figure 21:
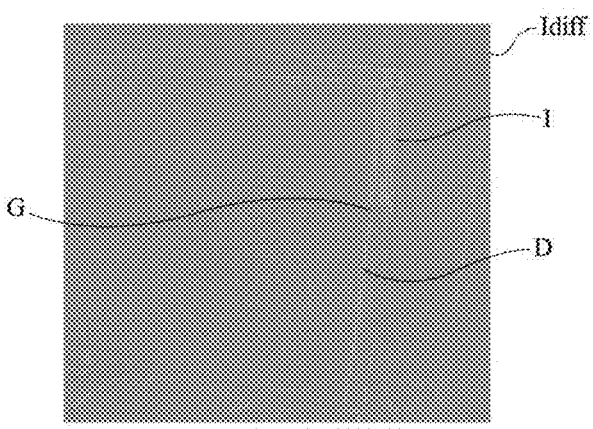
FIG. 21 is a figure similar to FIG. 20 after the implementation of a correction step.

The images shown in FIG. 19, FIG. 20, and FIG. 21 have been obtained during a fifth test.

FIG. 19 is a video image in grey scale of a scene acquired by image sensor 12. The elements of the scene are fixed and image sensor 12 is mobile with respect to the scene.

FIG. 20 shows the differential image Idiff of FIG. 19 in which are further shown the areas D of edge-of-interest pixels for which the local row movement classifier indicates a rightward movement, the areas G of edge-of-interest pixels for which the local row movement classifier indicates a leftward movement, and the areas I of edge-of-interest pixels for which the local row movement classifier indicates an indetermination. The leftward movement indicator is equal to 135 and the rightward movement indicator is equal to 318.

FIG. 21 is a figure similar to FIG. 20 obtained after the implementation of the previously-described correction consisting of increasing the pixel number threshold TH_NB used at step 22. The leftward movement indicator after correction is equal to 603 and the rightward movement indicator after correction is equal to 1,589.

Figure 22:
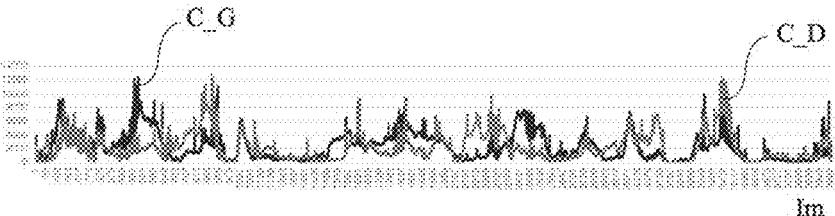
FIG. 22 shows curves of variation of a local row movement indicator indicating a rightward movement and a leftward movement for a video image sequence.

FIG. 22 shows, according to the rank of video images acquired by image sensor 12 for an image sequence, a curve C_G of variation of the leftward movement indicator and a curve C_D of variation of the rightward movement indicator. In this image sequence, image sensor 12 is displaced with respect to a desk and acquires images in a very close environment, as for the images of FIGS. 9, 12, and 16.

Figure 23:
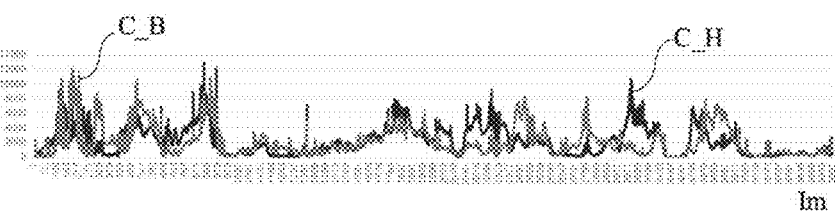
FIG. 23 shows curves of variation of a local column movement indicator indicating a downward movement and an upward movement for the same video image sequence.

FIG. 23 shows, according to the rank of video images acquired by image sensor 12 for the same image sequence as FIG. 22, a curve C_H of variation of the upward movement indicator and a curve C_B of variation of the downward movement indicator.

Figure 24:
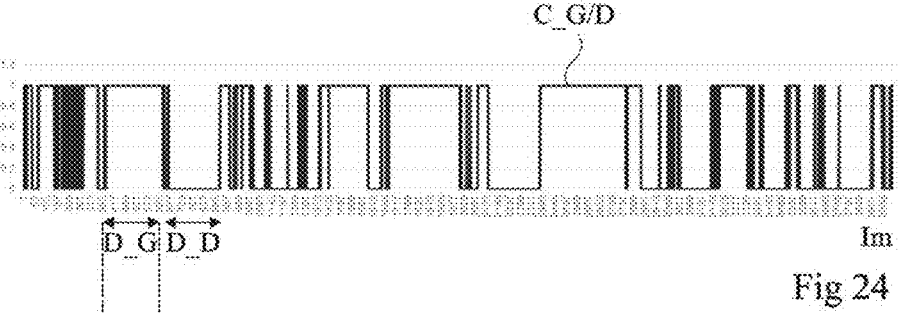
FIG. 24 shows a curve of variation of the general row movement classifier for the same video image sequence.

FIG. 24 shows, according to the rank of video images Im acquired by image sensor 12 for the same image sequence as FIG. 22, a curve C_G/D of variation of the general row movement classifier. In FIG. 24, the general row movement classifier is a binary signal which is at "1" when the general row movement classifier indicates a general leftward movement and which is at "o" when the general row movement classifier indicates a general rightward movement.

Figure 25:
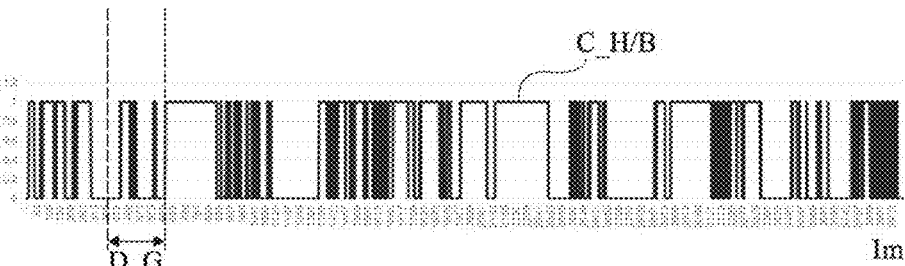
FIG. 25 shows a curve of variation of the general column movement classifier for the same video image sequence.

FIG. 25 shows, according to the rank of video images acquired by image sensor 12 for the same image sequence as FIG. 22, a curve C_H/B of variation of the general column movement classifier. In FIG. 25, the general column movement classifier is a binary signal which is at "1" when the general column movement classifier indicates a general upward movement and which is at "o" when the general column movement classifier indicates a general downward movement.

An analysis of C_G/D and C_H/B provides indications relative to the movement of image sensor 12 with respect to the scene. As an example, a phase D_G in FIG. 24 during which the general column movement classifier remains at "1" for a plurality of video images indicates an extended general leftward movement and a phase D_D in FIG. 24 during which the general column movement classifier remains at "1" for a plurality of video images indicates an extended general rightward movement. Further, since curve C_H/B alternates a plurality of times between values "0" and "1" during phase D_G, this means that image sensor 12 remains substantially horizontal during this phase.

In previously-described embodiments, method steps may be carried out by using one or a plurality of computing devices. The embodiments are not limited to an operation with a specific type of computing device.

Figure 26:
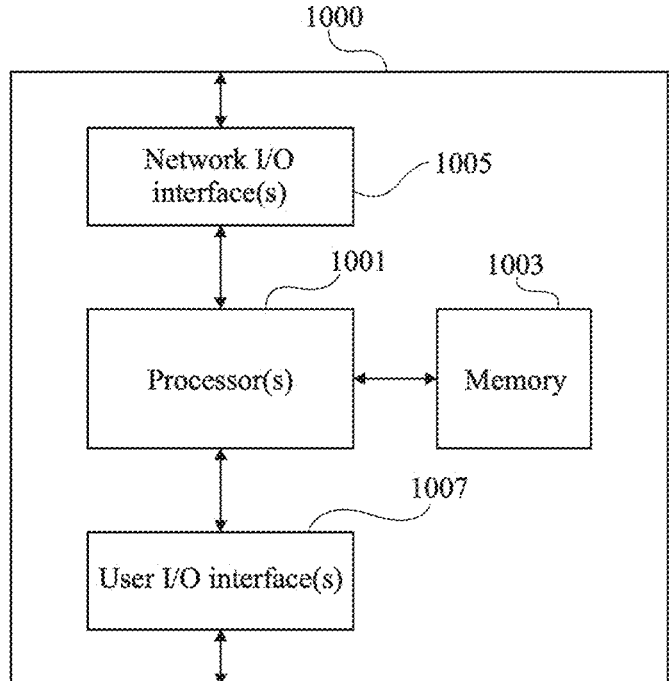
FIG. 26 partially and schematically shows an embodiment of a processing module of the system of FIG. 1.

FIG. 26 is a block diagram of a computing device 1000 which may be used to form detection module 12 and/or display control module 10. Computing device 1000 may comprise one or a plurality of processors 1001 (Processor(s)) and one or a plurality of non-transient computer-readable storage supports (for example, memory 1003 (Memory)). Memory 1003 may store, in non-transient computer-readable storage means, computer program instructions which, when they are executed, implement steps of the above-described detection method. Processor(s) 1001 may be coupled to memory 1003 and may execute these computer program instructions to cause the carrying out of these steps.

Computing device 1000 may also comprise a network input/output interface 1005 (Network I/O Interface(s)) via which the computing device can communicate with other computing devices (for example, over a network), and may also comprise one or a plurality of user interfaces 1007 (User I/O Interface(s)), via which the computing device can deliver an output signal to a user and receive an input signal originating from the user. The user interfaces may comprise peripherals such as a keyboard, a mouse, a microphone, a display peripheral (for ex. a monitor or a touch screen), loudspeakers, a camera, and/or various other types of input/output peripherals.

The above-described embodiments may be implemented in a plurality of ways. As an example, the embodiments may be implemented by means of a dedicated circuit, of software, or of a combination thereof. When they are implemented by software, the software code may be executed on any appropriate processor (for example, a microprocessor) or an assembly of processors, be they provided in a single computing device or distributed between a plurality of computing devices. It should be noted that any component or assembly of components qui which carry out the above-described method steps may be considered as one or a plurality of controllers which control the above-described steps. The controller or the controllers may be implemented in many ways, for example with a dedicated electronic circuit or with a general-purpose circuit (for example, one or a plurality of processors) which is programmed by means of a software or of a microcode to execute the above-described methods steps.

On this regard, it should be noted that an embodiment described herein comprises at least one computer-readable storage support (RAM, ROM, EEPROM, flash memory or another memory technology, CD-ROM, digital versatile disk (DVD) or another support with an optical disk, magnetic tape, magnetic band, magnetic storage disk, or another magnetic storage device, or another non-transient computer-readable storage support) coded with a computer program (that is, a plurality of executable instructions) which, when it is executed on a processor or a plurality of processors, carries out steps of the above-described embodiments. The computer-readable support may be transportable so that the program stored thereon can be loaded on any computing device to implement aspects of the techniques described herein. Further, it should be noted that the reference to a computer program which, when it is executed, carries out one of the above-described method steps, is not limited to an application program executed on a host computer. Conversely, the terms computer program and software are used herein in a general sense to refer to any type of computer code (for example, application software, firmware, a microcode, or any other form of computer instruction) that can be used to program one or a plurality of processors to implement aspects of the previously-described methods.

Various embodiments and variants have been described. Those skilled in the art will understand that certain features of these various embodiments and variants may be combined, and other variants will occur to those skilled in the art. Finally, the practical implementation of the described embodiments and variants is within the abilities of those skilled in the art based on the functional indications given hereabove.

The invention claimed is:

1. A method of determining at least one classifier of a general movement along a first direction in a scene, the method comprising steps:
   a) determining a differential image based on first and second video images of the scene;
   b) selecting pixels of the differential image corresponding to edges of objects of the scene;
   c) determining, for each pixel selected at step b), at least one classifier of a local movement along the first direction at least at a first value and at a second value;
   d) determining a first indicator of the local movement along the first direction which depends on a sum of the at least one local movement classifier along the first direction at the first value and a second indicator of the local movement along the first direction which depends on a sum of the at least one local movement classifier along the first direction at the second value; and
   e) determining the at least one classifier of the general movement along the first direction based on a comparison of the first and second indicators of the local movement along the first direction.

2. The method according to claim 1, wherein, at step a), each pixel of the differential image is an affine function of a difference between the pixels at the same position in the first and second video images.

3. The method according to claim 1, wherein step a) further comprises a step of segmentation of the differential image to delimit at least two portions of the differential image, steps b), c), d), and e) being implemented separately for each portion of the differential image.

4. The method according to claim 1, wherein step b) comprises a first selection of pixels of the differential image for which an absolute value of a difference between each pixel and a constant is greater than a first pixel value threshold.

5. The method according to claim 4, wherein step b) comprises a second selection of pixels of the differential image among the pixels of the first selection, comprising selecting, for each group of adjacent pixels along the first direction, only of a pixel at a beginning of the group and of a pixel at an end of the group.

6. The method according to claim 4, wherein step b) comprises removing, from the first selection, of each group of adjacent pixels along the first direction for which a number of pixels is smaller than a pixel number threshold.

7. The method according to claim 1, wherein step c) comprises, for each pixel of the differential image selected at step b), the determination of the classifier of the local movement along the first direction of the selected pixel at least at the first value or at the second value based on a value of the selected pixel and on a result of the comparison between a first pixel equal to the pixel of the first or second video image located along the first direction just before the selected pixel or a first noise level equal to a noise level of pixels of the differential image located along the first direction just before the selected pixel and a second pixel equal to the pixel of the first or second video image located along the first direction just after the selected pixel or a second noise level equal to a noise level of pixels of the differential image located along the first direction just after the selected pixel.

8. The method according to claim 7, wherein, for each pixel of the differential image selected at step b), step c) comprises:

in response to the selected pixel being lower than a second pixel value threshold and in response to the first pixel being lower than the second pixel or the first noise level being lower than the second noise level, the classifier of the local movement along the first direction of the selected pixel is set to the first value;

in response to the selected pixel being higher than the second pixel value threshold and in response to the first pixel being lower than the second pixel or the first noise level being lower than the second noise level, the classifier of the local movement along the first direction of the selected pixel is set to the second value;

in response to the selected pixel being lower than the second pixel value threshold and in response to the first pixel being higher than the second pixel or the first noise level being higher than the second noise level, the classifier of the local movement along the first direction of the selected pixel is set to the second value; and in response to the selected pixel being higher than the second pixel value threshold and in response to the first pixel being higher than the second pixel or the first noise level being higher than the second noise level, the classifier of the local movement along the first direction of the selected pixel is set to the first value.

9. The method according to claim 7, wherein the first noise level is equal to a standard deviation of values of a number K of adjacent pixels of the differential image along the first direction located just before the selected pixel, and the second noise level is equal to a standard deviation of values of the number K of adjacent pixels of the differential image along the first direction located just after the selected pixel.

10. The method according to claim 9, wherein the first noise level and/or the second noise level are replaced with a maximum noise level value in response to the respective K pixels being higher than a third pixel value threshold.

11. The method according to claim 1, further comprising:

at step c), determining, for each pixel of the differential image selected at step b), at least one classifier of the local movement along a second direction, different from the first direction, at least at a third value or at a fourth value;

at step d), determining a first indicator of the local movement along the second direction which depends on the sum of the local movement classifiers along the second direction at the third value and a second indicator of the local movement along the second direction which depends on the sum of the local movement classifiers along the second direction at the fourth value; and at step e), determining a classifier of the general movement along the second direction based on the comparison of the first and second indicators of the local movement along the second direction.

12. The method according to claim 11, wherein, at step d), for each pixel of each group of pixels selected at step b) and aligned along a third direction inclined to within 10° along a bisector with respect to the first and second directions, when the classifier of the local movement along the first direction of the pixel in the group is at the first value and the classifier of the local movement along the second direction of the pixel in the group is at the fourth value, the classifier of the local movement along the first direction of the pixel in the group is weighted by a factor smaller than one in the determination of the first indicator of the local movement along the first direction and the classifier of the local movement along the second direction of the pixel in the group is weighted by the factor in the determination of the first indicator of the local movement along the second direction, and, when the classifier of the local movement along the first direction of the pixel in the group is at the second value and the classifier of the local movement along the second direction of the pixel in the group is at the fourth value, the classifier of the local movement along the first direction of the pixel is weighted by the factor in the determination of the second indicator of the local movement along the first direction and the classifier of the local movement along the second direction of the pixel in the group is weighted by the factor in the determination of the second indicator of the local movement along the second direction.

13. The method according to claim 11, wherein the pixels of the video images and of the differential image are arranged in rows and in columns, the first direction corresponding to a row direction and the second direction corresponding to a column direction.

14. The method according to claim 1, further comprising:

illuminating the scene with a radiation; and capturing the radiation to acquire the video images of the scene.

15. A system for determining at least one classifier of a general movement along a first direction in a scene, the system comprising:

a video image acquisition image sensor; and a processing module configured to:

a) determine a differential image based on first and second video images of the scene received from the video image acquisition image sensor;

b) select pixels of the differential image corresponding to edges of objects of the scene;

c) determine, for each pixel selected at step b), at least one classifier of a local movement along the first direction at least at a first value and at a second value;

d) determine a first indicator of the local movement along the first direction which depends on a sum of the at least one local movement classifier along the first direction at the first value and a second indicator of the local movement along the first direction which depends on a sum of the at least one local movement classifier along the first direction at the second value; and e) determine the at least one classifier of the general movement along the first direction based on a comparison of the first and second indicators of the local movement along the first direction.

16. The system according to claim 15, wherein, at step a), each pixel of the differential image is an affine function of a difference between the pixels at the same position in the first and second video images.

17. The system according to claim 15, wherein step a) further comprises a step of segmentation of the differential image to delimit at least two portions of the differential image, steps b), c), d), and e) being implemented separately for each portion of the differential image.

18. The system according to claim 15, wherein step b) comprises a first selection of pixels of the differential image for which an absolute value of a difference between each pixel and a constant is greater than a first pixel value threshold.

19. The system according to claim 18, wherein step b) comprises a second selection of pixels of the differential image among the pixels of the first selection, comprising a selection, for each group of adjacent pixels along the first direction, only of a pixel at a beginning of the group and of a pixel at an end of the group.

20. The system according to claim 18, wherein step b) comprises a removal, from the first selection, of each group of adjacent pixels along the first direction for which a number of pixels is smaller than a pixel number threshold.

21. The system according to claim 15, wherein step c) comprises, for each pixel of the differential image selected at step b), the determination of the classifier of the local movement along the first direction of the selected pixel at least at the first value or at the second value based on a value of the selected pixel and on a result of the comparison between a first pixel equal to the pixel of the first or second video image located along the first direction just before the selected pixel or a first noise level equal to a noise level of pixels of the differential image located along the first direction just before the selected pixel and a second pixel equal to the pixel of the first or second video image located along the first direction just after the selected pixel or a second noise level equal to a noise level of pixels of the differential image located along the first direction just after the selected pixel.

22. The system according to claim 21, wherein, for each pixel of the differential image selected at step b), step c) comprises:

in response to the selected pixel being lower than a second pixel value threshold and in response to the first pixel being lower than the second pixel or the first noise level being lower than the second noise level, the classifier of the local movement along the first direction of the selected pixel is set to the first value;

in response to the selected pixel being higher than the second pixel value threshold and in response to the first pixel being lower than the second pixel or the first noise level being lower than the second noise level, the classifier of the local movement along the first direction of the selected pixel is set to the second value;

in response to the selected pixel being lower than the second pixel value threshold and in response to the first pixel being higher than the second pixel or the first noise level being higher than the second noise level, the classifier of the local movement along the first direction of the selected pixel is set to the second value; and in response to the selected pixel being higher than the second pixel value threshold and in response to the first pixel being higher than the second pixel or the first noise level being higher than the second noise level, the classifier of the local movement along the first direction of the selected pixel is set to the first value.

23. The system according to claim 21, wherein the first noise level is equal to a standard deviation of values of a number K of adjacent pixels of the differential image along the first direction located just before the selected pixel, and the second noise level is equal to a standard deviation of values of the number K of adjacent pixels of the differential image along the first direction located just after the selected pixel.

24. The system according to claim 23, wherein the first noise level and/or the second noise level are replaced with a maximum noise level value in response to the respective K pixels being higher than a third pixel value threshold.

25. The system according to claim 15, further comprising:

at step c), determining, for each pixel of the differential image selected at step b), at least one classifier of the local movement along a second direction, different from the first direction, at least at a third value or at a fourth value;

at step d), determining a first indicator of the local movement along the second direction which depends on the sum of the local movement classifiers along the second direction at the third value and a second indicator of the local movement along the second direction which depends on the sum of the local movement classifiers along the second direction at the fourth value; and at step e), determining a classifier of the general movement along the second direction based on the comparison of the first and second indicators of the local movement along the second direction.

26. The system according to claim 25, wherein, at step d), for each pixel of each group of pixels selected at step b) and aligned along a third direction inclined to within 10° along a bisector with respect to the first and second directions, when the classifier of the local movement along the first direction of the pixel in the group is at the first value and the classifier of the local movement along the second direction of the pixel in the group is at the fourth value, the classifier of the local movement along the first direction of the pixel in the group is weighted by a factor smaller than one in the determination of the first indicator of the local movement along the first direction and the classifier of the local movement along the second direction of the pixel in the group is weighted by the factor in the determination of the first indicator of the local movement along the second direction, and, when the classifier of the local movement along the first direction of the pixel in the group is at the second value and the classifier of the local movement along the second direction of the pixel in the group is at the fourth value, the classifier of the local movement along the first direction of the pixel is weighted by the factor in the determination of the second indicator of the local movement along the first direction and the classifier of the local movement along the second direction of the pixel in the group is weighted by the factor in the determination of the second indicator of the local movement along the second direction.

27. The system according to claim 25, wherein the pixels of the video images and of the differential image are arranged in rows and in columns, the first direction corresponding to a row direction and the second direction corresponding to a column direction.

28. The system according to claim 15, further comprising:

an illuminating device configured to illuminate the scene with a radiation; and the video image acquisition image sensor further configured to capture the radiation to acquire the video images of the scene.

* * * * *